(12) United States Patent
Marchi et al.

(10) Patent No.: US 6,464,232 B1
(45) Date of Patent: Oct. 15, 2002

(54) LEAF SEAL

(75) Inventors: Marc Roger Marchi, Le Mee sur Seine; Jean-Pierre Louis Mareix, Chartrettes; Patrice Rosset, Le Mee sur Seine, all of (FR)

(73) Assignee: Societe Nationale d'Etude et de Construction de Monteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/436,769

(22) Filed: Nov. 9, 1999

(30) Foreign Application Priority Data

Nov. 19, 1998 (FR) .............................. 98 14534

(51) Int. Cl.$^7$ ............................. F16J 15/02; F04D 5/20; F04P 29/04
(52) U.S. Cl. ....................... 277/630; 277/637; 277/641; 415/173.1; 415/170.1; 415/174.2; 415/229; 415/230
(58) Field of Search ................. 277/630, 632, 277/637, 634, 641, 903; 415/191, 170.1, 174.2, 231, 173.1, 229, 230

(56) References Cited

U.S. PATENT DOCUMENTS

| 3,869,222 | A | * | 3/1975 | Rahnke et al. |
| 4,251,986 | A | * | 2/1981 | Thompson et al. |
| 4,815,933 | A | * | 3/1989 | Hansel et al. |
| 4,925,365 | A | * | 5/1990 | Crozet et al. |
| 5,118,120 | A | * | 6/1992 | Drerup et al. |
| 5,143,292 | A | * | 9/1992 | Corsmeier et al. |
| 5,201,846 | A | * | 4/1993 | Sweeney |
| 5,797,723 | A |   | 8/1998 | Frost et al. |
| 5,987,879 | A | * | 11/1999 | Ono |
| 5,997,247 | A |   | 12/1999 | Arraitz et al. |

FOREIGN PATENT DOCUMENTS

FR    2 649 463    1/1991

* cited by examiner

Primary Examiner—Lynne H. Browne
Assistant Examiner—Vishal Patel
(74) Attorney, Agent, or Firm—Oblon, Spivak, McClelland, Maier & Neustadt, P.C.

(57) ABSTRACT

A sealing device is disclosed comprising a least one sealing leaf maintained axially in position by a retaining bracket which comprises a first end bearing on the sealing leaf and a bent-back second end engaged in a groove in a structural element. The sealing leaf is preferably retained radially in position by lugs which are bent so as to engage below lugs provided on the retaining bracket. When the sealing device comprises at least two adjacent sealing leaves placed edge to edge, the device also comprises a cover sheet so disposed between the sealing leaves and the retaining bracket as to cover the joint between the two adjacent leaves.

6 Claims, 3 Drawing Sheets

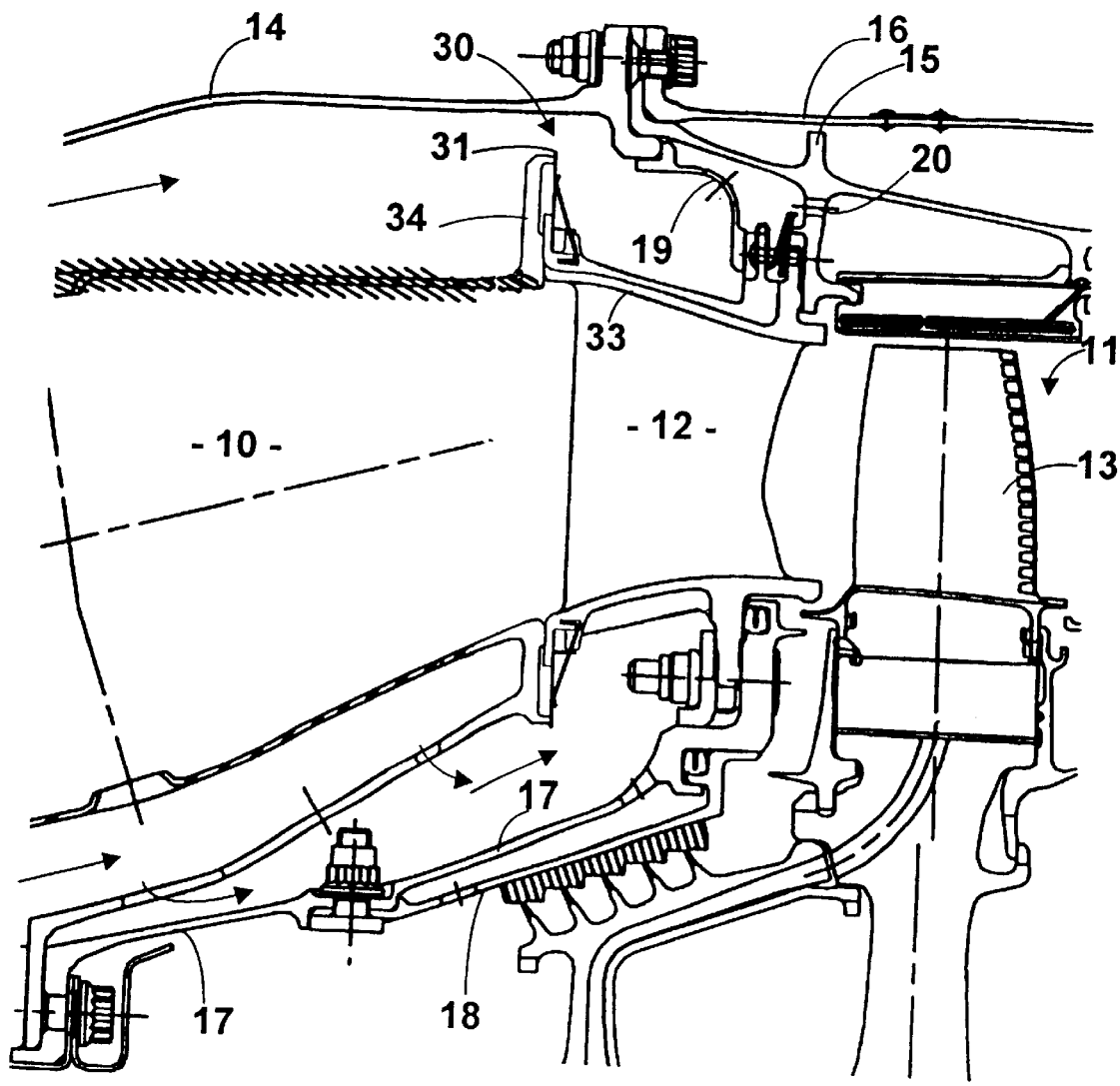
Fig : 1

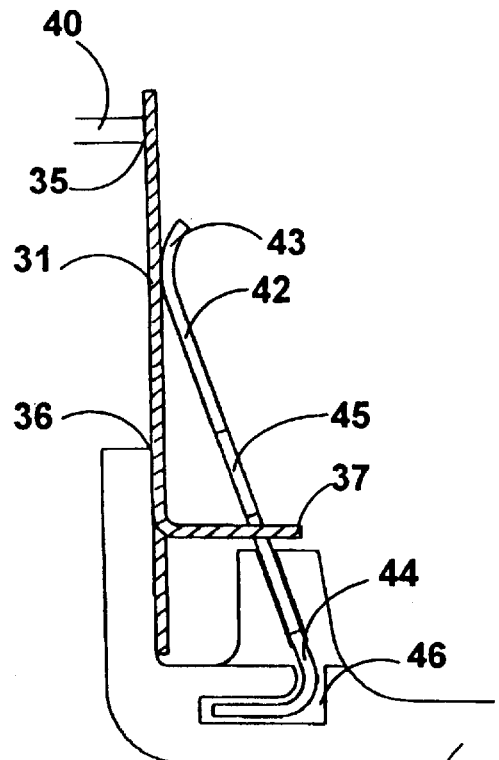
Fig: 2
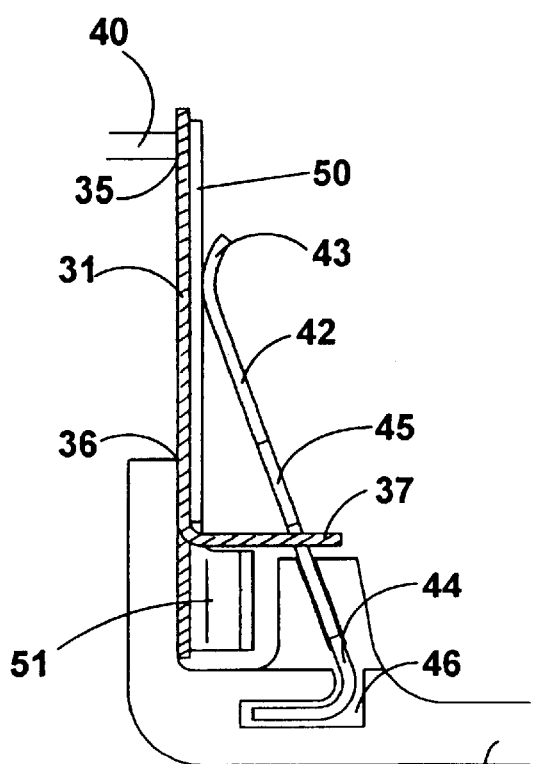
Fig: 3

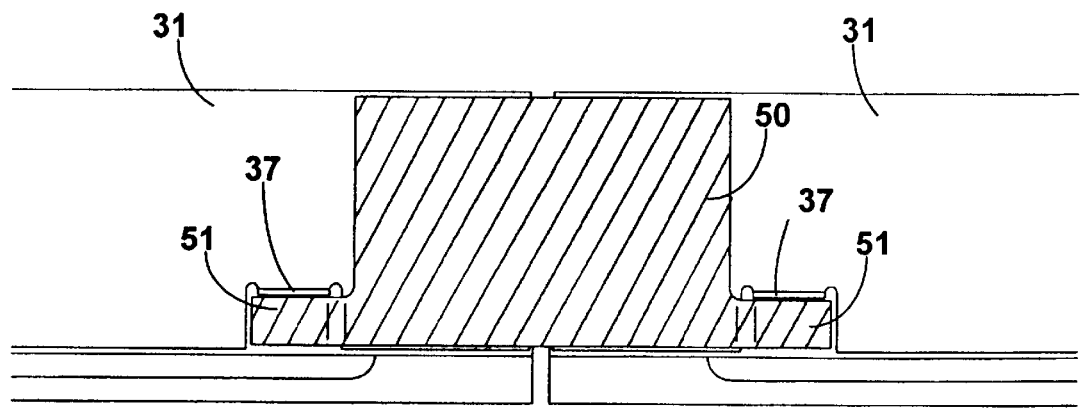
Fig : 4
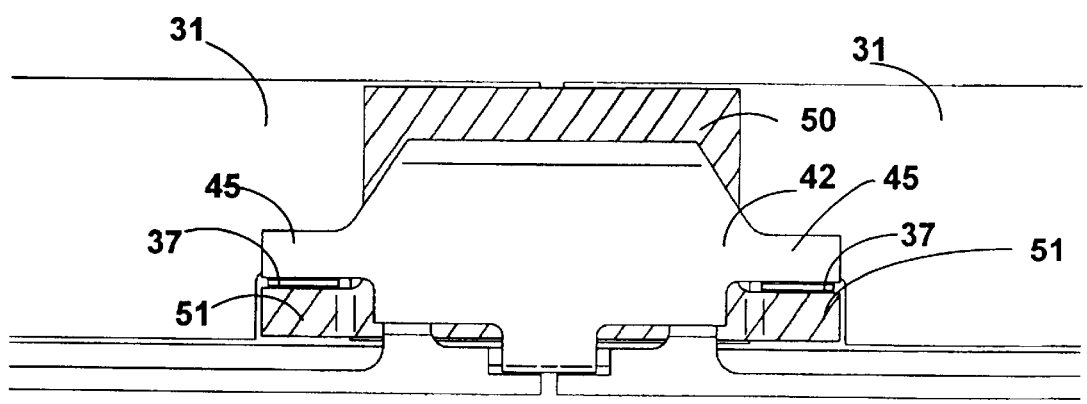
Fig : 5

# LEAF SEAL

BACKGROUND OF THE INVENTION

1. Field of the Invention

The invention relates to a sealing device, referred to herein as a leaf seal, which uses a thin sheet or leaf to ensure fluid tightness between two zones of fluid flow. It is of use in particular with turbomachine nozzle rings to ensure fluid tightness between an aerodynamic flow path in which there is a hot gas flow and a chamber supplying air for cooling a nozzle ring.

2. Summary of the Prior Art

Leaf seals are often used to ensure fluid tightness between two adjacent structural elements of a turbomachine in which there is a considerable pressure difference between the structural elements.

When the structural elements are of annular shape, as in the case with many turbomachine elements, a number of curved leaf seals are used and arranged in contact with one another so as to form a substantially continuous annular seal between the structural elements.

The known leaf seals comprise a thin flexible leaf formed with an aperture in which a pin secured to one of the adjacent structural elements slides.

To retain the leaf in a sealing position the seal may also comprise, as described, for example, in French patent No. 2649463, a spring comprising a first part mounted on one of the structural elements and a second part mounted on the seal support pin. The problem with this seal is that leakages occur through the aperture in which the pin slides.

SUMMARY OF THE INVENTION

It is an object of the invention to solve this problem and to provide an effective leaf seal which is not permanently mounted on the structural elements, the seal comprising a pinless retaining system which is easy to demount and manufacture and which retains the seal stably in its operative sealing position.

To this end, the invention provides a leaf seal for ensuring fluid tightness between a first and a second structural element having a space therebetween, said leaf seal comprising at least one flexible sealing leaf disposed in a sealing position in said space between said first and said second structural elements, said sealing leaf having first and second contact generators bearing on said first and second structural elements respectively, and a retaining bracket having a first end bearing on said sealing leaf and a second end which is bent back and engaged in a groove provided in said second structural element in order to locate said sealing leaf axially and to retain said sealing leaf permanently in said sealing position by clamping said leaf between said retaining bracket and said first and second structural elements.

Preferably, the sealing leaf is retained radially in position by retaining means in the form of lateral lugs provided on the retaining bracket and lugs which are bent at right-angles at the lower end of the leaf and which engage under the lateral lugs of the bracket.

In the case in which the seal comprises at least two adjacent leaves placed edge to edge, the seal also comprises a flat cover strip or plate disposed between the leaves and the bracket so as to cover the joint between the two adjacent leaves.

Further preferred features and advantages of the invention will become apparent from the following description of the preferred embodiments, given by way of example only, with reference to the accompanying drawings.

BRIEF DESCRIPTION OF THE DRAWINGS

FIG. 1 is a diagrammatic longitudinal sectional view of part of a turbomachine incorporating a leaf seal in accordance with the invention.

FIG. 2 is a sectional view illustrating one embodiment of a leaf seal in accordance with the invention.

FIG. 3 is a view similar to FIG. 2 but showing another embodiment.

FIG. 4 is a rear elevational view of the leaf seal shown in FIG. 3 with the retaining bracket removed.

FIG. 5 is a view similar to FIG. 4 but showing the retaining bracket in place.

DESCRIPTION OF THE PREFERRED EMBODIMENTS

FIG. 1 shows a turbomachine comprising a combustion chamber 10 and a high pressure turbine 11 having one or more stages. Each turbine stage comprises a row of guide vanes 12 and a row of rotor blades 13 disposed alternately in a known manner. The high pressure turbine is supported by a structure comprising, on the radially outer side of the turbine, an outer casing 14 of the combustion chamber, an outer turbine ring 15 and a turbine casing 16 which are all bolted together. On the radially inner side of the turbine, an inner casing 17 of the combustion chamber is connected to an inner ring 18 of the turbine. In conventional manner high pressure cooling air flows around the annular combustion chamber in the annular chamber disposed between the casing and the liner of the combustion chamber. The cooling air also flows downstream through orifices 19, 20 to cool the turbine guides.

Air leaks between the structural elements of the turbomachine which are disposed between the combustion chamber 10 and the guide vane stage 12 must be avoided to ensure the required cooling air flow in the elements of the engine. To this end, a seal in accordance with the invention is disposed in the space separating the structural elements of the engine which are situated between the combustion chamber 10 and the guide vane stage 12. The seal comprises a leaf 31 having an inner end in contact with the front wall of an outer casing 33 of the guide vane stage 12, and an outer end in contact with the rear wall 34 of the combustion chamber. The leaf is retained in its sealing position by retaining means which is described hereinafter with reference to FIGS. 2 to 5.

FIG. 2 illustrates one embodiment of the leaf seal in accordance with the invention. The seal comprises a flexible leaf 31, which is intended to form a seal between two structural elements 40 and 41, and a retaining bracket 42 intended to maintain the flexible leaf axially and radially in its sealing position. The flexible leaf is disposed in a space separating the first and second structural elements 40, 41 and comprises a first contact generator or surface 35 and a second contact generator or surface 36 which, in the sealing position, bear on the first and second structural elements 40, 41 respectively. The retaining bracket 42 comprises a first end 43 bearing on the sealing leaf 31 and a second end 44 bent back in the form of a pin engaged in a groove 46 in the second structural element 41. The second end 44 of the bracket 42 is retained by the groove, and the bracket acts to retain the leaf 31 in its operative sealing position by a clamping action. The first end 43 of the bracket 42 is preferably curved in a direction away from the leaf to increase the bearing force acting on the leaf. Advantageously, the bracket 42 is mounted in a prestressed state to provide a spring effect.

The bracket 42 retains the sealing leaf 31 radially in position, for example by means of interengaging lugs on the leaf and the bracket. In the embodiment shown in FIG. 2, the sealing leaf 31 has lugs 37 cut in its lower edge and bent at right angles so that they engage below lateral lugs 45 provided on the bracket 42.

FIG. 3 is a sectional view of an embodiment of the leaf seal for use with annular structural elements. In this case a number of curved leaf seals are used, and the sealing leaves are disposed edge to edge to form a substantially continuous annular seal between the structural elements.

To prevent leaks between two adjacent leaves the seal also comprises a flexible cover strip or plate 50 disposed between the sealing leaves and a retaining bracket so as to cover the joint between the two adjacent leaves. The two adjacent sealing leaves and the cover plate are retained axially in position by the retaining bracket.

The retaining bracket 42, cover plate 50 and sealing leaves 31 retain one another radially in position, for example by means of a system of lugs which engage one below another. In the embodiment of FIGS. 3 to 5, the adjacent sealing leaves have right-angled lugs which engage below lateral lugs of the retaining bracket; and the cover plate 50 comprises two lateral lugs 51 bent twice at right-angles so that they engage below the lugs of the two adjacent sealing leaves 31.

The whole assembly is retained in its operative sealing position by the bracket 42 being engaged and retained in a groove 46 in the second structural element 41, in a manner similar to that described with reference to FIG. 2.

The invention has the advantage that all of the components of the seal may consist of sheet metal stampings, which are easy to produce. The seal is light, compact and inexpensive.

The invention is of course not limited to the embodiments which have been described in detail. In particular, the retaining bracket illustrated is shown as being disposed obliquely relative to the sealing leaf, but it can also be disposed parallel thereto. Also, the retaining bracket may or may not be prestressed, and other systems for radially retaining the sealing leaves in position may be used. The use of lugs is merely one particularly simple embodiment requiring no additional parts.

We claim:

1. A leaf seal for ensuring fluid tightness between a first and a second structural element having a space therebetween, said leaf seal comprising:

at least one flexible sealing leaf disposed in a sealing position in said space between said first and said second structural elements, said sealing leaf having first and second contact generators bearing on said first and second structural elements respectively, and a retaining bracket having a first end bearing on said sealing leaf and a second end which is bent back and engaged in a groove provided in said second structural element in order to locate said sealing leaf axially and to retain said sealing leaf permanently in said sealing position by clamping said sealing leaf between said retaining bracket and said first and second structural elements;

wherein the retaining bracket and the sealing leaf retain one another radially in position by interengaging lugs which engage one below another.

2. A leaf seal according to claim 1, wherein said retaining bracket is mounted in a prestressed state.

3. A leaf seal according to claim 1, wherein said seal further comprises:

at least two adjacent sealing leaves placed edge to edge, and a cover plate disposed between said sealing leaves and said retaining bracket so as to cover the joint between said two adjacent sealing leaves.

4. A leaf seal according to claim 3, wherein:

said retaining bracket, the cover plate and the adjacent sealing leaves retain one another radially in position by the interengaging lugs.

5. A leaf seal for ensuring fluid tightness between a first and a second structural element having a space therebetween, said leaf seal comprising:

at least one flexible sealing leaf disposed in a sealing position in said space between said first and said second structural elements, said sealing leaf having first and second contact generators bearing on said first and second structural elements respectively;

a retaining bracket having a first end bearing on said sealing leaf and a second end which is bent back and engaged in a groove provided in said second structural element in order to locate said sealing leaf axially and to retain said sealing leaf permanently in said sealing position by clamping said sealing leaf between said retaining bracket and said first and second structural elements;

at least two adjacent sealing leaves placed edge to edge; and a cover plate disposed between said sealing leaves and said retaining bracket so as to cover the joint between said two adjacent sealing leaves;

wherein said retaining bracket is provided with lateral lugs, said adjacent sealing leaves are provided with lugs which are bent at right angles and engage below said lateral lugs of said retaining bracket, and said cover plate is provided with a pair of lateral lugs which are bent twice at right angles and engage below said lugs of said two adjacent sealing leaves in order to retain said sealing leaves and said cover plate radially in position.

6. A leaf seal for ensuring fluid tightness between a first and a second structural element having a space therebetween, said leaf seal comprising:

at least one flexible sealing leaf disposed in a sealing position in said space between said first and said second structural elements, said sealing leaf having first and second contact generators bearing on said first and second structural elements respectively; and a retaining bracket having a first end bearing on said sealing leaf and a second end which is bent back and engaged in a groove provided in said second structural element in order to locate said sealing leaf axially and to retain said sealing leaf permanently in said sealing position by clamping said sealing leaf between said retaining bracket and said first and second structural elements;

wherein said retaining bracket is provided with lateral lugs, and said sealing leaf has lugs which are bent at right angles at the lower end of said sealing leaf and which engage below said lateral lugs of said bracket to retain said sealing leaf radially in position.

* * * * *

UNITED STATES PATENT AND TRADEMARK OFFICE
CERTIFICATE OF CORRECTION

PATENT NO. : 6,464,232 B1
DATED : October 15, 2002
INVENTOR(S) : Marc R. Marchi et al.

It is certified that error appears in the above-identified patent and that said Letters Patent is hereby corrected as shown below:

<u>Title page,</u>
Item [57], ABSTRACT,
Line 1, change "is disclosed comprising a" to -- has at --.
Line 3, change "comprises" to -- includes --.
Line 6, after "by", insert -- lateral --.
Line 6, after "below", insert -- interengaging --.
Line 8, change "comprises" to -- has --.
Line 9, change "comprises" to -- includes --.
Line 9, change "sheet" to -- plate --.
Line 11, change "the" (first occurrence) to -- a --.

<u>Column 1,</u>
Line 8, change "of use" to -- used --.
Line 13, change "Prior" to -- Background --.
Line 28, change "patent" to -- Patent --.
Line 38, change "demount" to -- dismount --.
Line 57, change "retaining means" to -- retainers --.
Line 57, delete "-".

<u>Column 2,</u>
Line 25, after "turbine", insert -- 11 --.
Line 26, change "the" (first occurrence) to -- a --.
Line 26, delete "of the".
Line 27, delete "turbine".
Line 27, after "chamber" but before the comma, insert -- 10 --.
Line 29, after "turbine" but before the comma, insert -- 11 --.
Line 30, after "chamber", insert -- 10 --.
Line 31, delete "of the turbine".
Line 31, after "In", insert -- a --.
Line 31, after "manner", insert -- , --.
Line 32, delete "annular".
Line 33, after "chamber" (first occurrence), insert -- 10 --.
Line 34, change "casing" to -- casings 14, 17 --.
Line 34, change "the" (first occurrence) to -- an inner --.
Line 34, after "chamber" but before the period, insert -- 10 --.
Line 36, change "guides" to -- guide vanes 12 --.
Line 37, delete "the" (first occurrence).
Line 37, delete "of the turbo-".
Line 38, delete "machine".
Line 39, change "vane stage" to -- vanes --.

UNITED STATES PATENT AND TRADEMARK OFFICE
CERTIFICATE OF CORRECTION

PATENT NO. : 6,464,232 B1
DATED : October 15, 2002
INVENTOR(S) : Marc R. Marchi et al.

It is certified that error appears in the above-identified patent and that said Letters Patent is hereby corrected as shown below:

Column 2 cont'd.,
Lines 42 and 47, change "the" (first occurrence) to -- a --.
Line 42, after "space", insert -- 30 --.
Line 42, delete "of".
Line 43, delete "the engine".
Line 44, change "vane stage" to -- vanes --.
Line 45, change "the" to -- a --.
Line 46, change "vane stage" to -- vanes --.
Line 48, after "chamber" but before the period, insert -- 10 --.
Lines 48, 55 and 56, after "leaf", insert -- 31 --.
Line 49, change "retaining means" to -- a retainer --.
Line 51, after "seal", insert -- 31 --.
Line 65, after "groove", insert -- 46 --.
Line 65, after "bracket" (second occurrence), insert -- 42 --.

Column 3,
Lines 1, 2 and 7, after "leaf", insert -- 31 --.
Line 6 and 24, delete "means of".
Line 6, after "lugs", insert -- 37 and 45 --.
Line 7, after "bracket", insert -- 42, respectively. --.
Line 8, after "has", insert -- the --.
Line 9, after "below", insert -- the --.
Lines 12, 15, 16, 36 and 37, after "seal", insert -- 31 --.
Lines 12 and 15, after "elements" but before the period, insert -- 40 and 41 --.
Line 12, after "case", insert -- , --.
Line 13, after "seals", insert -- 31 --.
Lines 13, 16, 18, 20, 26 and 45, after "leaves", insert -- 31 --.
Line 18, change "a" to -- the --.
Line 18, after "bracket", insert -- 42 --.
Line 19, after "leaves" but before the period, insert -- 31 --.
Line 20, after "plate", insert -- 50 --.
Line 21, after "bracket" but before the period, insert -- 42 --.
Line 24, after "lugs", insert -- 37, 45 and 51 --.
Line 26, after "lugs", insert -- 37 --.
Line 26, after "below", insert -- the --.
Line 27, after "lugs", insert -- 45 --.
Line 27, after "bracket" but before the comma, insert -- 42 --.
Line 28, delete "-".
Line 29, after "lugs", insert -- 37 and 45 --.
Line 32, change "a" to -- the --.

UNITED STATES PATENT AND TRADEMARK OFFICE
CERTIFICATE OF CORRECTION

PATENT NO.     : 6,464,232 B1
DATED          : October 15, 2002
INVENTOR(S)    : Marc R. Marchi et al.

It is certified that error appears in the above-identified patent and that said Letters Patent is hereby corrected as shown below:

Column 3 cont'd.,
Line 33, after "second", insert -- annular --.
Line 41, after "bracket", insert -- 42 --.
Line 42, after "leaf" but before the comma, insert -- 31 --.
Line 43, after "bracket", insert -- 42 --.
Line 46, after "of", insert -- the --.
Line 46, after "lugs", insert -- 37, 45 and 51 --.
Line 65, after "leaf", insert -- have interengaging lugs; wherein the retaining bracket and the sealing leaf --.

Column 4,
Line 53, change ";" to -- , --.

Signed and Sealed this

First Day of April, 2003

JAMES E. ROGAN
*Director of the United States Patent and Trademark Office*